Aug. 11, 1970 W. E. HOLLIMAN 3,523,691
FLUID SEAL DEVICE
Filed Aug. 23, 1968
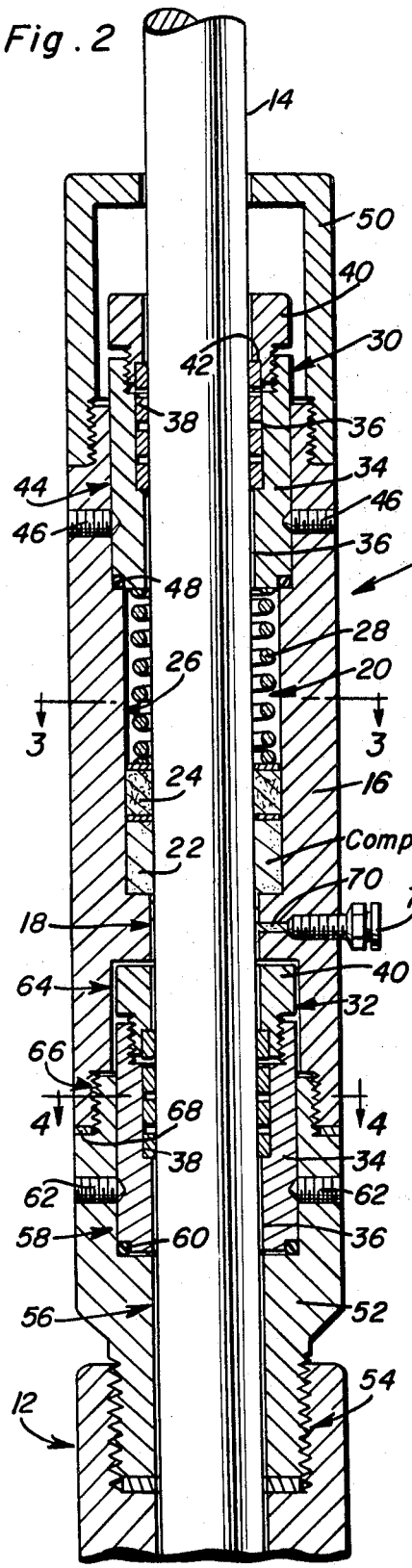
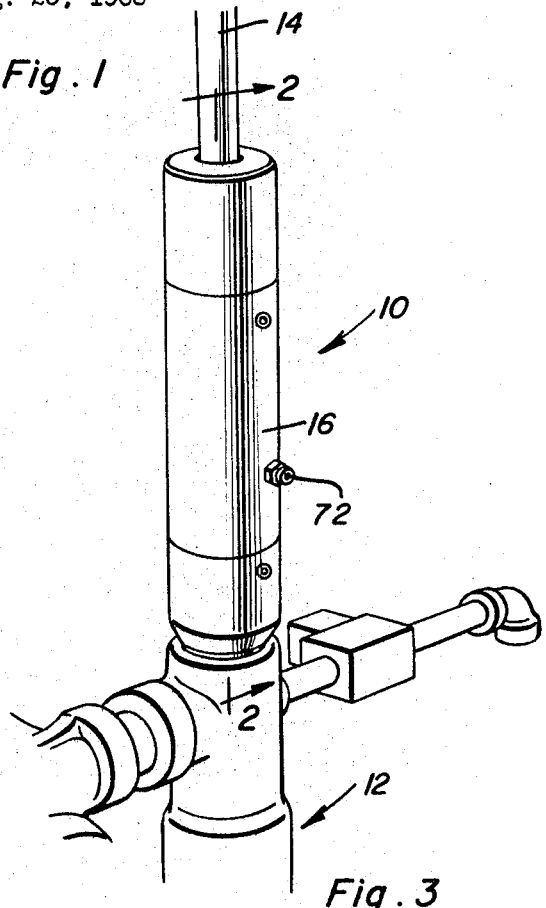
Fig. 1
Fig. 3
Fig. 4
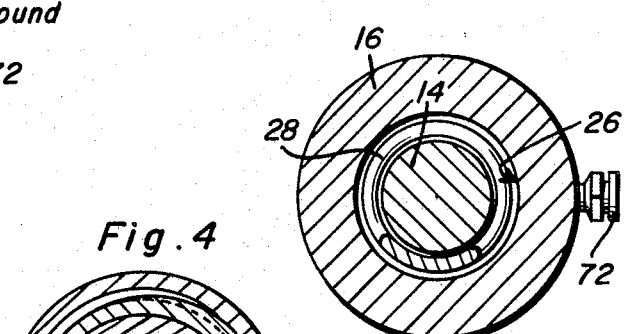
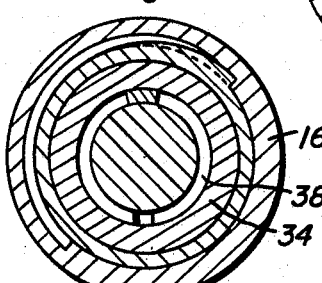
Wilford E. Holliman
INVENTOR.
BY Clarence A. O'Brien and Harvey B. Jacobson
Attorneys United States Patent Office 3,523,691

Patented Aug. 11, 1970

3,523,691
FLUID SEAL DEVICE

Wilford E. Holliman, P.O. Box 262, Big Lake, Tex. 76932

Filed Aug. 23, 1968, Ser. No. 754,870
Int. Cl. F16j *15/00, 15/40*
U.S. Cl. 277—4 4 Claims

ABSTRACT OF THE DISCLOSURE

A stuffing box for a reciprocating or rotating shaft wherein the sealing of the shaft is effected by a fluid seal means utilizing a liquid packing composition pressurized by a spring-urged applicator piston initially compressed by the pressurized injection of liquid packing into the device and wherein the stuffing box is further provided with means for dissipating heat generated within the stuffing box.

This invention relates to a fluid seal stuffing box and more particularly to a stuffing box wherein a liquid sealant is maintained pressurized by a spring urged applicator piston whereby the annulus between the shaft and stuffing box is packed by the liquid packing composition. More specifically, the present invention relates to a stuffing box particularly suited for utilization in conjunction with the sealing of the polished rod of a well pump.

Numerous polished rod stuffing boxes have been proposed heretofore for preventing the leakage of fluid being produced from a well along the reciprocating rotating shaft of a subsurface pump within the well. Such prior art attempts include "fluid seal" devices but generally such devices utilize fluid pressure to urge a mechanical seal element into sealing engagement with the movable member passing through the stuffing box. While such prior art device are generally effective for the intended purpose they are characterized by inherent disadvantages in that they present a maintenance problem inasmuch as disassembly of the stuffing box is generally required to effect replacement of the mechanical seal element. In this regard, it will be appreciated by those concerned with the operation and maintenance of well pumping equipment, for example, that shutdowns required for the servicing of polished rod stuffing boxes becomes quite bothersome, particularly when the well is in a remote, normally unattended, location.

It is therefore an object of the present invention to provide a fluid seal device of simple construction which is capable of effectively sealing a rotating or reciprocating shaft, such as generally encountered in conjunction with the sealing of the polished rod of a well pump, for example.

Another object of the present invention is to provide a novel construction for a fluid seal stuffing box wherein a liquid packing composition can be injected into the device, without disassembly thereof, to effect a seal about a moving member passing therethrough.

A further object of the present invention is to provide a fluid seal stuffing box having heat conductor means for dissipating any heat built up by the movement of a movable member relative to the stationary stuffing box.

Still another object of the present invention is to provide a novel construction for a fluid seal stuffing box wherein liquid packing composition for effecting a fluid seal therein is normally maintained pressurized by a spring-urged piston applicator means, the spring of which is compressed by the pressurized injection of liquid pack ing composition into the device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of an exemplary embodiment of a fluid seal stuffing box constructed in accordance with the present invention further showing the stuffing box operatively positioned on the production pipe of a well and in sealing engagement about the polished rod of the well pump;

FIG. 2 is an enlarged vertical cross-sectional view of the stuffing box of FIG. 1 taken substantially along the plane of the line 2—2 of FIG. 1;

FIG. 3 is a horizontal cross-sectional view taken substantially along the plane of the line 3—3 of FIG. 2;

FIG. 4 is a horizontal cross-sectional view taken substantially along the plane of the line 4—4 of FIG. 2; and FIG. 5 is a perspective view of a heat conductor member comprising an element of a heat dissipating means comprising a portion of the stuffing box of the present invention.

Referring now to the drawings in greater detail, a fluid seal stuffing box is indicated generally at 10 and comprises an exemplary embodiment of a stuffing box constructed in accordance with the principles of the present invention. For purposes of illustration only, the stuffing box 10 is illustrated as operatively position upon the production outlet means 12 of a well, such as an oil well for example, and wherein the stuffing box 10 is in encompassing and sealing relation to a polished rod 14 comprising a reciprocating or rotating shaft for the actuation of a down-hole pump actuated by an above ground prime mover, not shown, such as a motor operated walking beam, for example.

The fluid seal stuffing box 10 includes a packing chamber means comprising a packing chamber body portion 16, of generally tubular configuration, and provided with a through bore of varying diameter. The diameter of the through bore of the chamber body portion 16, intermediate the ends thereof as indicated at 18, is sized so as to closely approximate the diameter of the polished rod 14, but it will be understood that the through bore portion 18 is sized so as not to engage the polished rod 14. Merely by way of example, the clearance between the body portion 16 and the polished rod 14, at 18, may be in the order of inches. As will become more apparent hereinafter, the actual "seal" effected by the fluid seal stuffing box 10 is established in the region 18 by sealing of the small annular space between the reciprocating or rotating rod 14 and stationary body portion 16.

The packing chamber body portion 16 also includes a seal-effecting fluid applicator means indicated generally at 20 for effectively pressurizing a sealing fluid 22, generally a somewhat viscous lubricant of conventional formulation. The applicator means 20 includes a piston applicator 24 received within a counterbore 26 and wherein the piston applicator 24 is sized so as to effect a wiping seal at the annular faces between the applicator 24, counterbore 26 and rod 14. The applicator means 20 further includes a sealing fluid 22 pressurizing means comprising a helical spring 28 which normally biases the applicator 24 downwardly to effect pressurization of the sealing fluid 22, at the annulus 18, to a value exceeding the pressure of the fluid discharging from the well head 12.

The remaining major components of the fluid seal stuffing box 10 comprise upper and lower heat conductor means 30 and 32 respectively for centralizing the rod 14 relative to the reduced diameter portion 18 of the through bore in the packing chamber body portion 16 and simultaneously effectively dissipating heat generated by frictional contact of the means 30 and 32 with the rod 14.

The heat conductor and stabilizer means 30 and 32 are of substantially identical construction and each includes a heat conductor and stabilizer body portion 34 having a through bore 36 sized so as to non-frictionally encompass the rod 14. The body portion 34 is counterbored as at 36 for the reception of a heat conductor ring 38, as seen best in FIG. 5 formed of a good heat conducting alloy which is preferably also relatively non-corrodible and characterized by sufficient flexibility to enable it to be compressed into good heat conducting relationship with the rod 14 by a heat conductor ring adjusting nut 40 threadably received in a suitable counterbore in the upper face of the body member 34 and provided with a shoulder as at 42 for bearing against the upper edge of the conductor ring 38. The counterbore 36 is further counterbored as at 44 for the reception of the upper heat conductor and stabilizer means 30 which is secured therein by radially spaced fastener means such as the setscrews 46 and the interface between the body portion 34 and body portion 16 effectively sealed by an O-ring seal 48. The upper heat conductor and stabilizer means 30 is preferably covered by a protector cap 50 to provide dust protection therefor.

The lower heat conductor and stabilizer means 32 is fixedly secured in an adapter member 52 provided with suitable connector means as at 54 for connection of the fluid seal stuffing box 10 to the well head 12. The adapter 52 is bored and counterbored as at 56 and 58 respectively and wherein the counterbore 58 receives the lower heat conductor and stabilizer body portion 34 in sealing engagement thereto by means of O-ring 60 and setscrews 62. The through bore of the body portion 16 is counterbored as at 64 for the reception of the upper portion of the lower heat conductor and stabilizer means 32, and the adapter 52 connected to the body portion 16 by a suitable connector means, such as the pin and box connection indicated generally at 66 with a gasket 68 interposed between the faces thereof. The fluid seal stuffing box 10 is completed by a sealing fluid injection port 70 passing through the wall of the body portion 16, preferably adjacent the reduced diameter portion 18 of the through bore therein. The port 70 is counterbored for the reception of a conventional "button head" lubricant injection port means 72 such as conventionally utilized to inject lubricant into bearing housings. It will thus be appreciated that the button head 72 includes a check valve means, not shown, which precludes outward extrusion of sealing fluid 22 from the sealing fluid applicator means 20.

Turning now to the utilization of the fluid seal stuffing box 10, the device is operatively positioned relative to the well head by mounting the adapter 52 on the well head 12 followed by the placement of the lower heat conductor and stabilizer means 32 therein, and adjustment of the nut 40 thereof to effect contact of the ring 38 with the rod 14. The body portion 16 is then threadably connected to the adapter 52 and the piston applicator 24 and spring 28 positioned within the counterbore 26 followed by the securement of the upper heat conductor and stabilizer means 30 within the counterbore 44. Subsequent to the adjustment of the nut 40 thereof to urge the upper heat conductor ring 38 into engagement with the rod 14, the protective cover 50 is placed thereover. To place the fluid seal stuffing box into operation it is then merely necessary to inject sealing fluid 22 into the sealing fluid applicator means 20 through the button head injector 72 whereby the sealing fluid 22 entering urges the piston applicator 24 upwardly until the spring 28 is fully compressed. By way of explanation, it will be understood that the counterbore 26 is sized so as to insure that the pressure exerted by the applicator piston 24, as long as sealing fluid 22 remains in the chamber, exceeds the pressure within the well. Thus it will be appreciated that the piston applicator 24 applies a coating of the sealing composition 22 to the rod 14 thereby effectively sealing the annulus between the rod 14 and the contiguous reduced diameter portion 18 of the through bore in the body portion 16. Furthermore, from a consideration of the foregoing it will be appreciated that the applicator piston 24, under the influence of the spring 28, continuously and generally uniformly, pressurizes the fluid 22 during the entire stroke of the applicator 24. Upon depletion of the sealing fluid 22, such as may be occasioned by the sealing fluid being carried downwardly along the rod 14, it is merely necessary to replenish the supply of sealing fluid 22 by injection through the button head 72 with the attendant recompression of the spring 28. In addition, it will be seen that the heat conductor and rod stabilizer means 30 and 32 comprise simple, yet efficient, means of precluding premature wear of the reduced diameter portion 18 of the through bore in the body portion 16 thereby greatly increasing the effective life of the fluid seal stuffing box 10.

What is claimed as new is as follows:

1. A fluid seal stuffing box for rotary and reciprocatory shafts comprising a packing chamber including an elongated generally tubular packing chamber bored axially in varying diameters, the lesser diameter of the bore providing means being aproximately the size of the shaft and providing an annular space for establishing a fluid seal between the shaft and said packing chamber means, a seal-effecting liquid applicator means in said packing chamber means above the lesser diameter portion of the bore for normally continuously applying sealing liquid to the space between the shaft and said packing chamber means, said seal-effecting liquid applicator means including an axially movable spring-urged piston applicator in wiping sealing engagement with the shaft and said chamber means, valved injection port means in said packing chamber means in communication with the lower side of said piston applicator for the pressurized injection of sealing liquid into said seal-effecting liquid applicator means, means carried by said packing chamber means above and below the lesser diameter portion of the bore for stabilizing the shaft during movement of the shaft relative to the lesser diameter portion of the bore, and means for concentrically mounting said packing chamber means to an art device with which the shaft is associated.

2. The combination of claim 1 wherein said means for stabilizing the shaft each includes a heat conductor and stabilizer member concentrically disposed about the shaft in heat transfer engagement with the shaft for dissipating heat through said packing chamber means to the ambient atmosphere.

3. The combination of claim 2 wherein said spring for urging said piston applicator reacts against said upper stabilizer means.

4. The combination of claim 3 wherein each of said stabilizer means is provided with means for adjusting the engagement of said heat conductor member relative to the shaft.

References Cited

UNITED STATES PATENTS

| | | | |
|---|---|---|---|
| 2,410,291 | 10/1946 | Kinzbach | 277—72 |
| 3,199,876 | 8/1965 | Magos et al. | 277—72 |
| 3,319,647 | 5/1967 | Morain | 277—64 X |
| 3,395,923 | 8/1968 | Remke et al. | 277—72 X |

FOREIGN PATENTS 19,295   1904   Great Britain.

SAMUEL ROTHBERG, Primary Examiner

U.S. Cl. X.R.

277—59, 72, 22